United States Patent
Dean

(10) Patent No.: US 8,245,378 B2
(45) Date of Patent: Aug. 21, 2012

(54) METHOD AND APPARATUS FOR MANUFACTURING COMPONENTS USED FOR THE MANUFACTURE OF ARTICLES

(75) Inventor: Anthony Carl Dean, Sherwood, OR (US)

(73) Assignee: Nike, Inc., Beaverton, OR (US)

( * ) Notice: Subject to any disclaimer, the term of this patent is extended or adjusted under 35 U.S.C. 154(b) by 15 days.

(21) Appl. No.: 11/854,830

(22) Filed: Sep. 13, 2007

(65) Prior Publication Data

US 2009/0072436 A1    Mar. 19, 2009

(51) Int. Cl.
*B21D 39/03* (2006.01)
(52) U.S. Cl. ............... 29/428; 29/525.01; 29/525.11; 29/527.1
(58) Field of Classification Search .......... 264/219, 264/334, 223, 497; 29/525.01–525.15, 428, 29/252.11, 527.1; 425/175, 182, 406, 408, 425/414, 468, 467; 249/177, 122
See application file for complete search history.

(56) References Cited

U.S. PATENT DOCUMENTS

| | | | |
|---|---|---|---|
| 5,141,680 A | | 8/1992 | Almquist et al. |
| 5,204,055 A | * | 4/1993 | Sachs et al. ............... 419/2 |
| 5,458,825 A | * | 10/1995 | Grolman et al. ............ 264/401 |
| 5,460,851 A | | 10/1995 | Jenkins |
| 5,641,448 A | * | 6/1997 | Yeung et al. ............... 264/401 |
| 5,718,863 A | | 2/1998 | McHugh et al. |
| 5,847,958 A | | 12/1998 | Shaikh et al. |
| 5,879,725 A | * | 3/1999 | Potter .......................... 425/403 |
| 5,968,560 A | * | 10/1999 | Briere et al. ............ 425/192 R |
| 6,070,107 A | | 5/2000 | Lombardi et al. |
| 6,116,888 A | * | 9/2000 | Johnston et al. .............. 425/195 |
| 6,193,923 B1 | | 2/2001 | Leyden et al. |
| 6,660,209 B2 | | 12/2003 | Leyden et al. |
| 6,694,207 B2 | | 2/2004 | Darrah et al. |
| 7,077,638 B2 | | 7/2006 | Leyden et al. |
| RE39,354 E | | 10/2006 | Dickens, Jr. et al. |
| 7,590,466 B2 | * | 9/2009 | Lukis et al. ............... 700/200 |
| 2005/0035498 A1 | * | 2/2005 | Stevens .................... 264/401 |
| 2008/0020081 A1 | * | 1/2008 | Wilson et al. ............. 425/116 |

FOREIGN PATENT DOCUMENTS

| | | |
|---|---|---|
| CN | 201371529 | 12/2009 |
| DE | 10025804 A1 | 11/2001 |
| FR | 2 572 324 | * 10/1982 |
| WO | 02/098588 A1 | 12/2002 |

OTHER PUBLICATIONS

Office Action dated Jul. 8, 2011 in China Application No. 200810188732.2.

(Continued)

*Primary Examiner* — Katarzyna Wyrozebski Lee
*Assistant Examiner* — Vishal I Patel
(74) *Attorney, Agent, or Firm* — Banner & Witcoff, Ltd.

(57) ABSTRACT

Methods and apparatuses for manufacturing components used in the manufacture of wearable articles are presented. Some of the methods of manufacturing a mold and the apparatuses themselves include, among other features, forming a plate having a mold insert. The mold insert is removably connected to the plate and is formed using a rapid prototyping technique. In addition, methods for manufacturing wearable articles are presented. The methods generally including forming a mold, including a mold insert formed using a rapid prototyping technique. In addition, the methods include performing the steps of a molding operation on the mold. The molding operation may include any of several known molding operations.

19 Claims, 7 Drawing Sheets

OTHER PUBLICATIONS

China Application No. 200810188732.2, Office Action dated Feb. 24, 2011.

International Search Report and Written Opinion issued in corresponding PCT Application, International Application No. PCT/US2008/076116, issued on Feb. 9, 2009.

"Accura LaserForm™ ST-200 Material" from the website of 3D Systems (2 pages), 2004.

"LaserForm ST-100" from the website of 3D Systems (2 pages), 2001.

"Apex Cuts Processing Time by 50% to 75%" from the website of 3D Systems (2 pages), 2002.

"Rapid Prototyping: Tooling & Manufacturing State of the Industry—3D Keltool" issued by Wohlers Associates, Inc. in their Wohlers Report 2003 (2 pages).

"Rapid Tooling: It's Faster in Molding, Too," Plastics Technologies Magazine, http://www.ptonline.com/articles/rapidtooling-it's-faster-in-molding-too (7 pages), 2002.

Office Action issued in corresponding European Application, Application No. 08 830 938.0, issued on Oct. 7, 2011 (4 pages).

Response filed to Office Action issued in corresponding European Application, Application No. 08 830 938.0, filed on Apr. 3, 2012 (8 pages).

\* cited by examiner

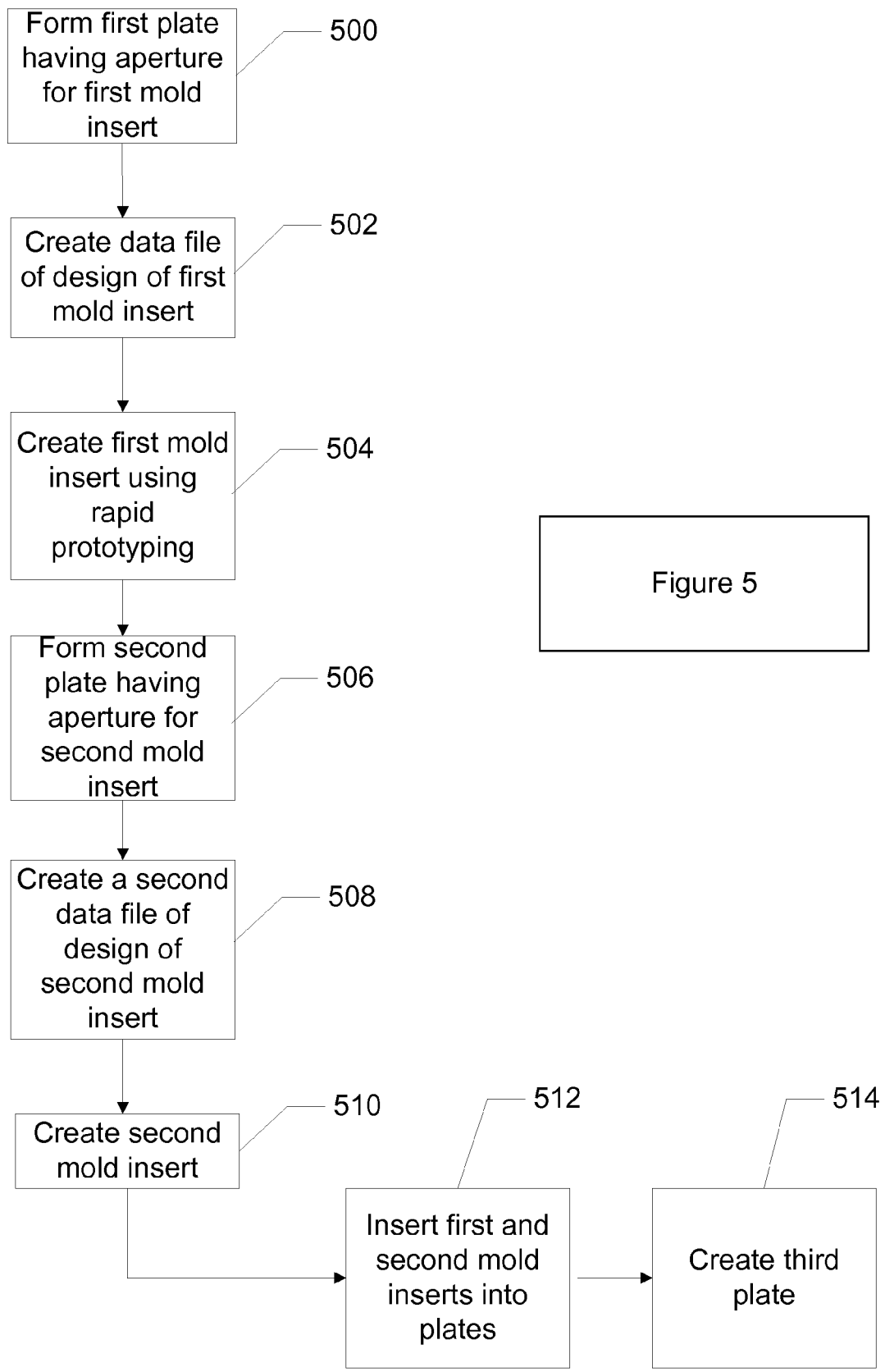

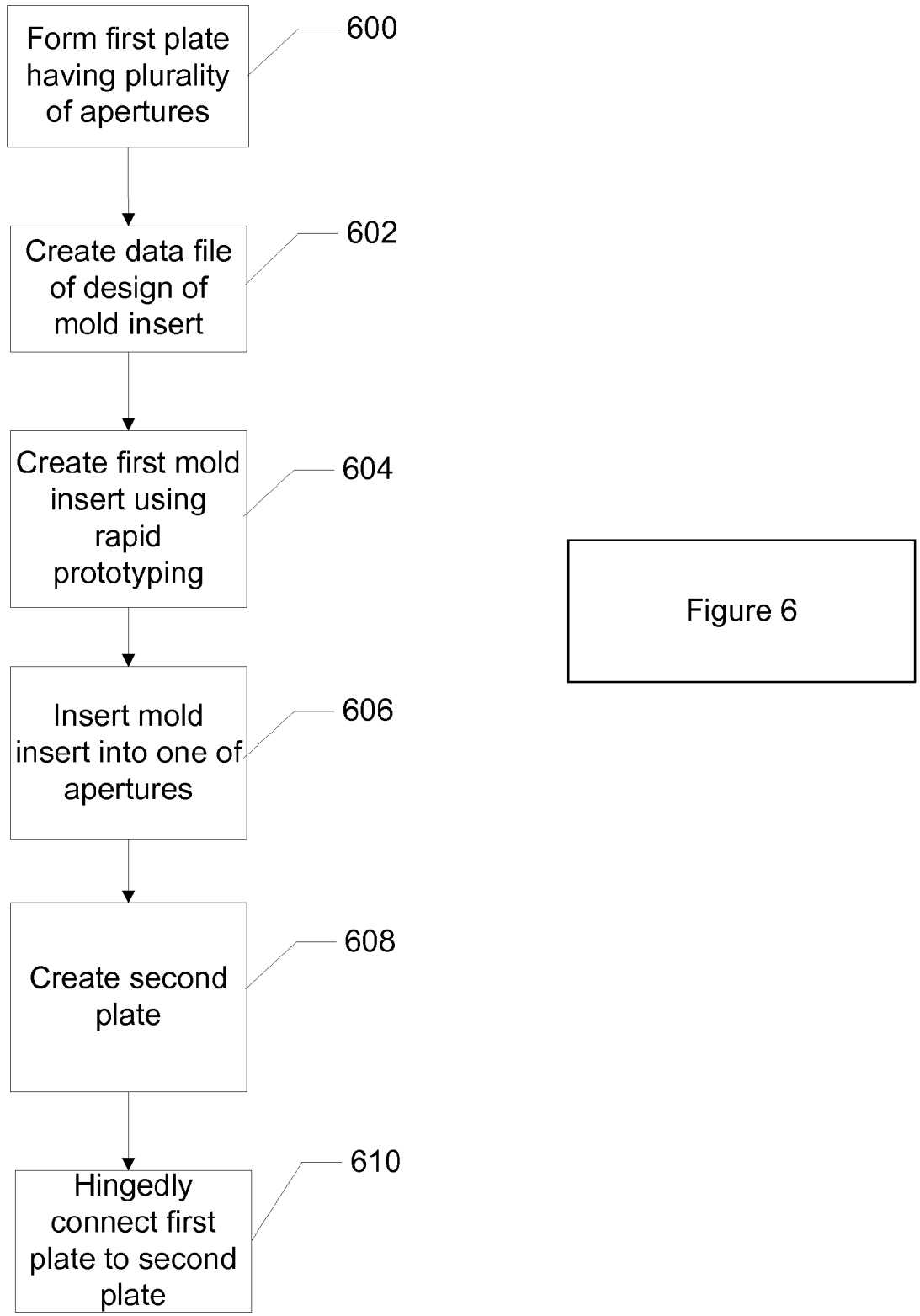

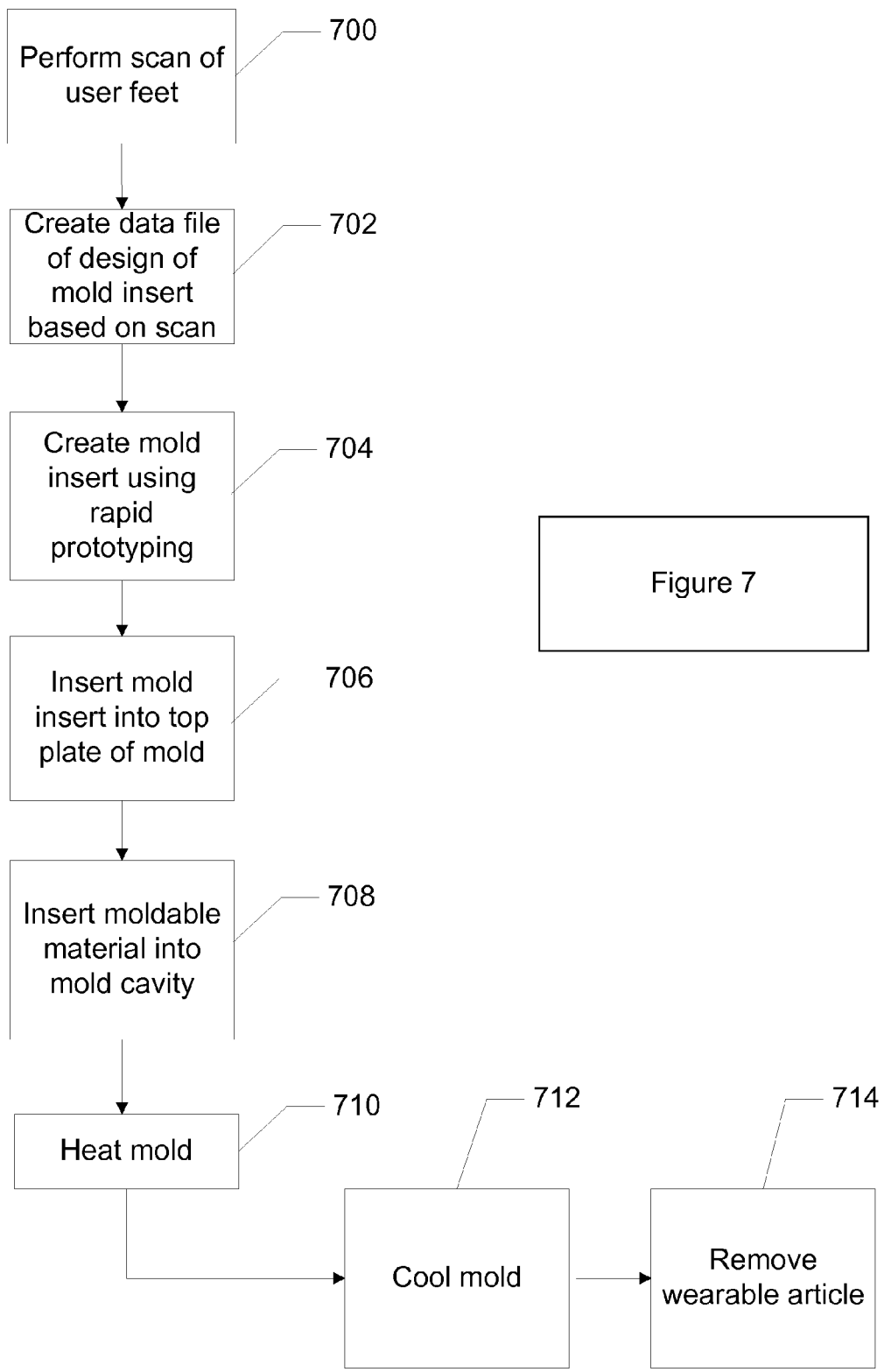

METHOD AND APPARATUS FOR MANUFACTURING COMPONENTS USED FOR THE MANUFACTURE OF ARTICLES

FIELD OF THE INVENTION

This invention relates generally to methods and apparatuses for the manufacture of articles. More particularly, aspects of this invention relate to methods of manufacturing molds and mold components formed using rapid prototyping technology, the molds being used to manufacture articles, including wearable articles such as footwear, including outsoles, midsoles, uppers, heel counters, watch bands, jewelry, athletic equipment, such as shin guards, hockey sticks, chest protectors, face masks, golf equipment and the like.

BACKGROUND

Various molding processes exist to form a variety of molded articles. For example, injection molding, blow molding, compression molding, vacuum molding, and the like, have been used in many industries for fabrication of various molded articles. The molds and molded articles can be formed from a number of materials and in a variety of configurations. Historically, a mold has been a costly piece of manufacturing equipment and has typically been suited to fabricate a single design of the molded article. In such an arrangement, any change to the design of the molded article generally would require the creation of a new mold. This arrangement then required a costly retooling anytime a change was made to the molded article design.

In addition, any change to the molded article design, or to the mold itself, would often require considerable time because the entire mold would need to be rebuilt. Further still, a given mold can only be used for the specific design of the molded article for which it was built. This would require multiple complete molds to fabricate multiple parts or multiple designs (e.g., parts of different sizes, different styles, etc., all typically require a new and different mold). These conventional mold arrangements are costly and generally limit the variations available within a production run of a given molded article.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to methods and apparatuses for manufacturing components used for the manufacture of articles, such as wearable articles. Some methods of manufacturing a mold according to aspects of this invention include: (a) forming a plate having a generally planar surface; (b) forming a second plate having at least one aperture configured to receive one or more mold inserts; and (c) forming a mold insert configured to removably connect to the second plate, wherein the mold insert is formed using a rapid prototyping technique. Some rapid prototyping techniques that may be used to form the mold insert are laser sintering, fused deposition modeling, and stereolithography.

Further aspects of this invention relate to molds for manufacturing various articles. Some molds include, for example: (a) a plate having a generally planar surface and formed of a first material; and (b) at least a second plate having at least one aperture configured for receiving a mold insert that is formed of a second material. The mold insert is formed using a rapid prototyping technique.

Additional methods described herein relate to manufacturing a wearable article according to aspects of the invention. Methods for manufacturing a portion of an article of footwear include, for example: (a) forming a first plate including at least one aperture; (b) forming a mold insert using a rapid prototyping technique, the mold insert configured for removable insertion into one of the apertures of the plurality of apertures in the first plate; (c) forming a second plate; (d) inserting a moldable material into a cavity created by the mold insert; (e) molding the moldable material; and (f) removing the portion of the article of footwear from the mold. In some arrangements, the mold insert is formed from a data file created based on a scan of the body part of the user that will be wearing the molded article.

BRIEF DESCRIPTION OF THE DRAWINGS

A more complete understanding of the present invention and certain advantages thereof may be acquired by referring to the following detailed description in consideration with the accompanying drawings, in which:

FIG. 5 includes a flowchart describing one method of manufacturing a mold according to aspects described herein;

FIG. 6 includes a flowchart describing another method of manufacturing a mold according to additional aspects described herein;

FIG. 7 includes a flowchart describing one method of manufacturing a portion of an article of footwear in accordance with the methods and apparatuses described herein.

Figure 1:
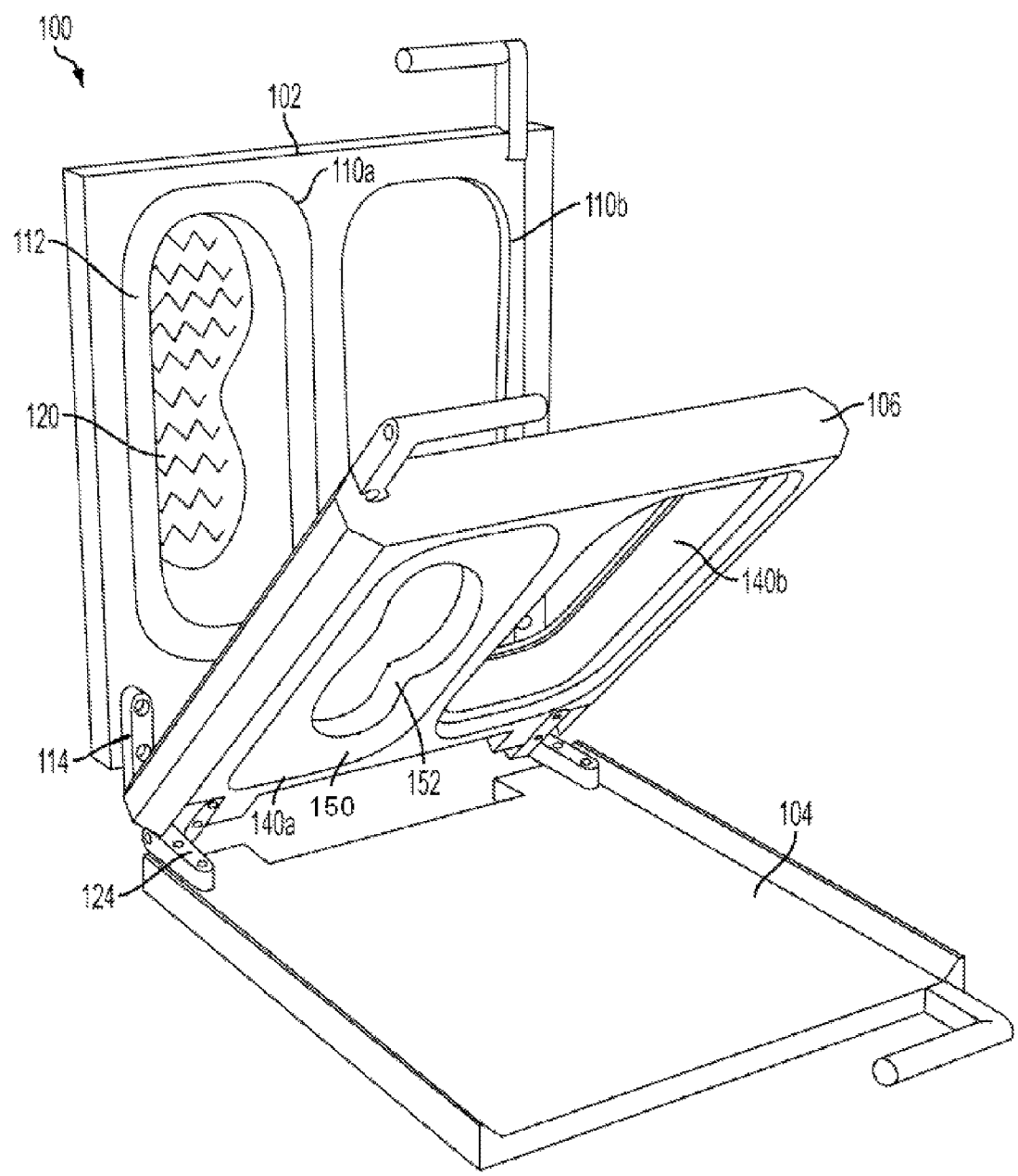
FIG. 1 generally illustrates a perspective view of one example of a three part mold according to aspects of this invention.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example methods and apparatuses for manufacturing wearable articles such as footwear, watch bands, apparel, and the like. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g. based on the example orientations shown in the figures and/or the orientations in typical use. Nothing in this specification should be construed as requiring a specific three dimensional or spatial orientation of structures in order to fall within the scope of this invention.

A. General Description of Methods and Apparatuses for Manufacturing Components Used to Manufacture Wearable Articles According to Examples of the Invention In general, as described above, aspects of this invention relate to methods and apparatuses for manufacturing components used in the manufacture of various wearable articles, such as footwear, watch bands, apparel, and the like. More detailed descriptions of aspects of this invention follow.

1. Example Manufacturing Components and Apparatuses According to the Invention

One aspect of this invention relates to a three part mold for manufacturing wearable articles wherein at least one portion of the mold is formed using a rapid prototyping technique. Such molds may include, for example: (a) a first plate formed of a first material and including a first mold insert formed of a second material; (b) a second plate that is generally planar and is formed of the first material; and (c) a third plate arranged between the first and second plates of the mold. The third plate may include a second mold insert that is formed of the second material. The first and second mold inserts are removably connected to their respective plates using fasteners, such as screws, bolts, and the like. The first and second mold inserts are formed using a rapid prototyping technique, such as laser sintering, fused deposition modeling, stereolithography, and the like.

The first and second mold inserts may be formed using a layer by layer formation process, such as the ones listed above. These processes allow the first and second mold inserts to be porous in nature. In addition, the first and second mold inserts can be formed having a uniform wall thickness. Further still, the mold inserts may be formed including a pattern or texture that will appear on a surface of the molded articles.

In some apparatuses, the first and second mold inserts may have heating or cooling elements included in the mold inserts during their formation. These heating and/or cooling elements allow for increased efficiency in the molding process.

In some examples, the first material of which the first, second and third plates are formed is one of steel, aluminum, and the like and the plates are hingedly connected to each other. In addition, the second material from which the mold inserts are formed may be nylon or glass filled nylon. The mold inserts may generally be formed to withstand the temperature and pressure associated with a manufacturing or molding process. For instance, the mold inserts are formed to withstand 300-350° F. temperatures and 5-20 tons of clamping tonnage that may be part of the manufacturing or molding process.

In yet another example apparatus, a two part mold for manufacturing wearable articles in accordance with this invention generally includes, for example: (a) a first plate that is generally planar and formed of a first material; and (b) a second plate including a first region that is generally planar and is formed of the first material. The first region includes one or more apertures. The second plate further includes a second region that includes a mold insert. The mold insert is configured for engaging the aperture of the first region and is formed of a second material. The mold insert is formed using a rapid prototyping technique, such as laser sintering, fused deposition modeling, stereolithography, and the like.

The two part mold of the previous example may be structured or built to include various aspects of the three part mold described above. For example, heating and cooling elements may be inserted into or otherwise included in the mold insert during formation of the mold insert, the mold insert may be formed to withstand the processing parameters of a given manufacturing process, etc.

2. Example Methods of Manufacturing Components and Apparatuses for Use in the Manufacture of Wearable Articles According to the Invention Another aspect of this invention relates to methods of manufacturing components and apparatuses, such as molds, for use in the manufacture of wearable articles in accordance with examples of this invention. Such methods may include: (a) forming a first plate from a first material; (b) forming a mold insert from a second material using a rapid prototyping technique; (c) forming a second plate including at least one aperture or cavity configured to receive the mold insert; and/or hingedly (or otherwise) engaging the second plate with the first plate. The mold insert is removably connected to the second plate using fasteners, such as screws, bolts, and the like. The mold insert may be formed having a uniform wall thickness. In addition, the mold insert is formed using a rapid prototyping technique, such as laser sintering, fused deposition modeling, stereolithography, and the like.

In another example, a method of manufacturing a mold includes, for example: (a) forming a first plate having a generally planar region and an aperture configured to receive a first mold insert; (b) forming the first mold insert and removably connecting it to the first plate; (b) forming a second plate that is generally planar; (c) forming a third plate including at least one aperture configured for receiving a second mold insert; (d) forming the second mold insert and removably connecting the second mold insert to the third plate; and/or arranging the third plate between the first plate and the second plate. The first, second and third plates of this example may be hingedly or otherwise connected with one another. The first and second mold inserts are formed using rapid prototyping techniques, such as laser sintering, fused deposition modeling, stereolithography, and the like.

The steps of forming the first and second mold inserts may include forming a pattern or texture on the mold inserts that will be present on a surface of a molded article. In addition, the steps of forming the first and second mold inserts may including implanting or otherwise providing heating and cooling elements in the mold inserts to improve efficiency of the process of molding the wearable articles.

3. Example Methods of Manufacturing Articles According to the Invention

Another aspect of this invention relates to the manufacture of articles, including wearable articles, in accordance with examples of this invention. One method of manufacturing wearable articles, such as a portion of an article of footwear, includes, for example: (a) forming a first plate having at least one aperture; (b) forming a mold insert using a rapid prototyping technique, wherein the mold insert is configured for insertion into one of the apertures of the plurality of apertures of the top plate; (c) forming a second plate having a generally planar surface; (d) inserting a moldable material into a cavity created by the mold insert; (e) molding the moldable material; and (f) removing the molded article from the cavity. The steps of the molding operation may include heating and cooling the mold to form the wearable article being molded. The molding operation may be one of injection molding, compression molding, vacuum molding, blow molding, and the like.

The method of manufacturing described above can also be used with a three part mold, as described in additional example of this invention. Additionally or alternatively, the mold insert may be formed from a virtual design contained in a stored data file. The virtual design may be created by a designer or operator or, in some examples, the virtual design may be created based on a scan of the body part of the user that will be wearing the molded article.

B. General Description of Methods and Apparatuses for Manufacture of Articles, Including Wearable Articles Additional aspects of this invention relate to methods and apparatuses for manufacturing wearable articles, such as footwear, watch bands, apparel and the like. More detailed descriptions of these aspects of this invention follow.

1. Example Apparatuses for Manufacturing Articles, Including Wearable Articles, According to the Invention Example apparatuses for manufacturing wearable articles include at least one plate having a plurality of apertures configured for receiving a mold insert. The mold insert is formed using a rapid prototyping technique and is removably connected to the plate. The apparatus also includes a second plate having a generally planar surface. In some arrangements, a third plate is also included. The third plate may also have a plurality of apertures configured for receiving a mold insert.

2. Example Methods of Manufacturing Apparatuses for Manufacturing Articles, Including Wearable Articles, and Methods of Manufacturing Wearable Articles According to this Aspect of the Invention As noted above, the methods of manufacturing apparatuses for manufacturing wearable articles according to this invention may include: (a) forming a first plate having at least one aperture configured to receive a mold insert; (b) forming a mold insert using a rapid prototyping technique; (c) forming a second plate; and/or (d) hingedly (or otherwise) engaging the first plate with the second plate. In other example methods, a third plate may be formed including a plurality of apertures configured for receiving a mold insert.

Additionally or alternatively, methods of manufacturing wearable articles, as described above, may include: (a) forming a first plate; (b) forming a mold insert using a rapid prototyping technique, the mold insert configured for removable connection to the first plate; (c) inserting a moldable material into a cavity created by the mold insert; and (d) performing a molding process on the mold.

Specific examples of the invention are described in more detail below. The reader should understand that these specific examples are set forth merely to illustrate examples of the invention, and they should not be construed as limiting the invention.

C. Specific Examples of the Invention

FIG. 1 generally depicts an example mold 100 that may be produced and/or used in accordance with aspects of the invention. The mold 100 may be used to manufacture any number of articles, including but not limited to wearable articles such as footwear, watch bands, apparel, and the like. The mold 100 of FIG. 1 is generally a three part mold 100 shown in an open configuration. That is, the mold 100 includes a top plate or carrier 102, a second or bottom plate 104, and a middle plate or carrier 106. The mold plates 102, 104, 106 may be formed of any suitable material, such as steel, aluminum, and the like. Other mold arrangements, such as a two part mold (200 in FIG. 2), can be produced and/or used in accordance with aspects of the invention and will be discussed further below.

In the arrangement shown in FIG. 1, the top plate 102 includes two recessed areas or apertures 110a, 110b arranged to accommodate a top mold insert 112. The top plate 102 shown includes one top mold insert 112 inserted into the top plate aperture 110a and one aperture 110b without a top mold insert inserted. The top mold insert 112 may be contained within the aperture 110a using any suitable means for maintaining the position of the top mold insert 112 on the top plate 102. In some arrangements, the top mold insert 112 is removably connected to the top plate 102 using fasteners such as bolts, screws and the like. The top plate 102 also includes at least one hinge 114. The at least one hinge 114 connects the top plate 102 to the middle plate 106 in order to provide movement between the two plates 102, 106.

The top mold insert 112 generally includes a cavity region 120 in which at least a portion of the molded article is formed. In the example shown in FIG. 1, the top mold insert 112 provides a mold cavity 120 for forming the bottom surface of an outsole for an article of footwear. The top mold insert 112 generally works in conjunction with a middle plate mold insert 150 to form the molded article, as will be discussed further below. Features of this invention may be used to produce other articles of manufacture, including other portions of articles of footwear, such as midsoles or portions thereof, uppers or portions thereof, etc.

The mold 100 further includes a bottom plate 104. The bottom plate 104 of this example structure includes a generally flat, planar surface. The bottom plate 104 may provide a smooth surface against which the article being molded may form when the three plates 102, 104, 106 of the mold 100 are in a closed configuration. In addition, the bottom plate 104 includes at least one hinge 124. The at least one hinge 124 may connect the bottom plate 104 to the middle plate 106 in order to permit movement of the bottom plate 104 relative to the middle plate 106.

The three part mold 100 of FIG. 1 further includes middle plate 106. The middle plate 106 is arranged between the top plate 102 and bottom plate 104 such that, when the mold 100 is in a closed configuration, the top plate 102 and bottom plate 104 are substantially in contact with the middle plate 106.

The middle plate 106 further includes a plurality of apertures 140a, 140b into which a middle plate mold insert 150 may be placed. The plurality of apertures 140a, 140b may be shaped to accommodate any type of middle plate mold insert 150. As shown in FIG. 1, the apertures 140a, 140b have a generally rectangular shape. Accordingly, the corresponding middle plate mold insert 150 includes a complimentary substantially rectangular shape. This arrangement allows the middle plate, or plate into which the mold insert will be inserted, to be formed having a standard size and shape that can be used and reused with any mold insert sized to fit within the aperture of the plate. For instance, several different articles, designs, etc. can be formed from the same mold by simply changing the mold insert. This arrangement may simplify manufacturing of the mold and may reduce production costs.

The middle plate mold insert 150 may be held in place using any suitable means for maintaining the mold insert 150 within the middle plate aperture 140a. In some arrangements, the middle plate mold insert 150 is removably attached to the middle plate aperture 140a using fasteners such as bolts, screws, and the like.

The middle plate mold insert 150 generally creates a mold cavity 151 configured for molding the side portions of the article being formed. For example, in the mold 100 of FIG. 1, the middle plate mold insert 150 may include detailing along the inner portion 152 of the sidewalls and front and rear walls. This detailing will be used to form corresponding detailing on the side portions of the outsole for an article of footwear. When in a closed configuration, top mold insert 112 and middle plate mold insert 150 shown in FIG. 1 will form a mold cavity configured to form a complete outsole for an article of footwear.

As used in accordance with aspects described herein, the top mold insert 112 and the middle plate mold insert 150 of FIG. 1 are formed using rapid prototyping techniques. For example, the mold inserts 112, 150 may be formed using laser sintering, fused deposition modeling, stereolithography, and the like. Rapid prototyping fabrication techniques involve taking virtual designs from a data file, such as Computer Aided Design (CAD) file, and automatically building the object of the design in a layer by layer process. Essentially, the fabrication equipment reads the design from the CAD file and lays down successive layers of powder, liquid or sheet material in successive layers to build the three dimensional object. The layers are joined together or fused by the fabrication equipment to join the layers together, thereby forming the three dimensional object of the design. Such rapid prototyping techniques are generally known in the art.

One particular process form forming mold inserts that may be used in accordance with aspects described herein is laser sintering. This process involves creating a virtual design in a data file, such as a CAD file. The laser sintering fabrication equipment reads the CAD file and forms the three dimensional object of the design using a high powered laser to fuse powders or small particles of plastic, metal or ceramic. The laser selectively fuses powdered material by scanning cross-sections generated from a CAD file or a scan of the part on the surface of a powder bed. After each cross-section is scanned, the powder bed is lowered by one layer thickness, a new layer of material is applied on top, and the process is repeated until the part is completed. Laser sintering, and other rapid prototyping processes are generally known in the art. One example system is found in U.S. Pat. No. 5,156,697 to Bourell et al. and is incorporated herein by reference.

For example, in order to create a middle plate mold insert 150, such as the one shown in FIG. 1, an initial layer of powder of a desired material would be laid down. Next, a second layer of powder would be placed on top of the first layer. The high powered laser would then use the CAD file to determine where to fuse to the two layers of powder together. For instance, the layers would be fused around the perimeter but not in the central region. The powder laid out in the central region would be removed (e.g., after the laser sintering process is complete) and possibly reused. The layering and fusing process continues until the object of the CAD file is formed.

Using rapid prototyping techniques to form the top 112 and middle plate mold inserts 150 permits the mold inserts 112, 150 to be rapidly formed. For instance, a mold insert 112, 150 can be formed from a CAD file using laser sintering. Forming the mold insert may take less time than forming a conventional mold. Should changes to the mold insert 112, 150 be desired, the CAD file may be altered to implement the changes and a new mold insert 112, 150 may be formed using laser sintering in a similar time frame. In order to change the mold to produce articles with the alterations, the existing mold insert 112, 150 is removed from the corresponding plate 102, 106 and the new mold insert 112, 150 is inserted and is removably held in place using any known fastening means. Articles may then be produced with the alterations. The change in the article is made by changing the mold insert 112, 150, rather than retooling the entire mold, as in conventional molds. This greatly simplifies the process of making changes to a mold and/or molded article and allows running changes to be made to the manufactured article. In addition, there is substantial cost savings because only the mold insert 112, 150 would be changed (and new mold inserts can be produced using rapid and relatively inexpensive CAD designing and rapid prototyping technology), rather than retooling the entire mold from metal or other conventional materials. Essentially, using rapid prototyping techniques to form the mold inserts allows easy fabrication of modular mold inserts that can be quickly and easily altered or changed at any time during production.

In addition, the method described provides the ability to customize a mold. Slight changes can be made to the CAD file from which the mold inserts 112, 150 are made in relatively short time. In one example, slight changes could be made to every mold insert 112, 150 formed, thereby causing each article formed from the mold to be different, based on the mold insert used. While this is not a likely a bulk production method due to time and cost, the customization this arrangement permits would make this type of targeted customization feasible.

Further, the mold insert 112, 150 may be formed from a scan of the body part intended to wear the molded article. For instance, the feet of a user may be scanned and a CAD file of the article to be formed may be created based on the scan. The CAD file created from the scan may then be used to create a mold insert 112, 150 that may be used to create a customized shoe to fit the exact characteristics of the foot of the user. Systems used for such scanning are generally known in the art. For example, U.S. Pat. No. 5,880,961 to Crump describes one such method and is incorporated herein by reference.

Using rapid prototyping techniques, such as laser sintering, to create the mold inserts also allows for the creation of texture in the molded article without any additional processing. For example, any desired texture can be included in the mold insert when it is created, thereby eliminating the need to further process the molded article to create the desired texture, as was necessary in conventional mold arrangements.

In addition, using rapid prototyping techniques, such as laser sintering to create mold inserts allows for creation of a mold that can withstand the processing requirements associated with processing or molding articles such as footwear. For instance, the mold inserts created are able to withstand processing between 300° F. and 350° F. In addition, the mold inserts and molds created are able to withstand a clamping tonnage between 5 and 20 tons.

The mold inserts 112, 150 may be formed of any suitable material that can withstand the above-described processing parameters. For example, the mold inserts 112, 150 may be formed of nylon. In one particular example, the mold insert is formed of glass filled nylon. In another example, the mold insert is formed of aluminum filled nylon.

Further still, the use of rapid prototyping techniques, such as laser sintering, to create the mold inserts 112, 150 provides for the creation of a porous mold insert. That is, the layer by layer creation of the mold inserts 112, 150 may result in small air pockets within the mold insert 112, 150. In some arrangements, the mold insert 112, 150 created is between 95% and 98% solid. In still other arrangements, the mold insert created is approximately 96% solid. This porousness allows air or other fluids to escape from the mold cavity created by the mold insert when the mold is in use. Additionally or alternatively, if desired, the laser sintering or other rapid prototyping techniques can be adjusted to form small holes or channels through the mold inserts to allow for air or other fluid escape.

Products made using the method and apparatus described herein, such as articles of footwear, watch bands, apparel, and the like, can be formed using any known molding process. That is, the molded insert and method of forming the mold and molded insert described herein can be used with injection molding, blow molding, vacuum molding, compression molding processes and other molding processes. In addition, these products can be formed of any suitable moldable material such as rubber, vinyl, polymers, ethylvinylacetate and phylon.

In addition, various heat transfer elements (320 in FIG. 3) may be embedded within the mold inserts 112, 150 during fabrication of the mold inserts 112, 150. For example, heating elements may be implanted in the mold insert carrier and the mold insert 112, 150. The heating elements may be inserted during the laser sintering process. The heating elements allow heat to be introduced to the mold inserts 112, 150 to provide a more efficient molding process. For example, conventional molds require heat to be passed to mold cavity through the metal of the carrier plates. In the arrangement described, heat can be more directly introduced into the mold cavity to reduce the time required to heat the mold to the desired temperature.

Additionally or alternatively, cooling elements or air flow tubes may be embedded in the mold insert 112, 150 during fabrication. These cooling elements may allow additional airflow to the molded article during a cooling phase of the mold process. The additional airflow may improve the efficiency of the mold process.

Rather than adding hardware elements to the mold insert, if desired, the rapid prototyping procedure can be used to integrally form air or fluid flow channels (for heating or cooling purposes) directly in the mold insert structure.

In addition, thermistors (330 in FIG. 3) may be inserted into the mold inserts 112, 150 during the laser sintering process. The thermistors 330 allow the operator to monitor the heat levels in various regions within the mold inserts 112, 150. These heat levels can then be controlled to make the molding process more efficient.

Using solid deposition modeling techniques, such as laser sintering, to form mold inserts 112, 150 also allows for the inserts 112, 150 to be formed having a non-uniform wall thickness or a uniform wall thickness, as desired. For example, a uniform wall thickness in the mold inserts 112, 150 may allow for more even heat distribution in the mold inserts 112, 150 and throughout the molded article. In addition, the uniform wall thickness will allow for more even transfer of heat from the mold carrier or plate to the mold insert and ultimately to the molded article. The more even heat distribution and heat transfer may result in a more efficient molding process. However, if a non-uniform wall thickness is desired, the mold inserts 112, 150 can be produced having whatever wall thickness is desired (e.g., depending on the content of the CAD file from which the mold is produced).

Figure 2:
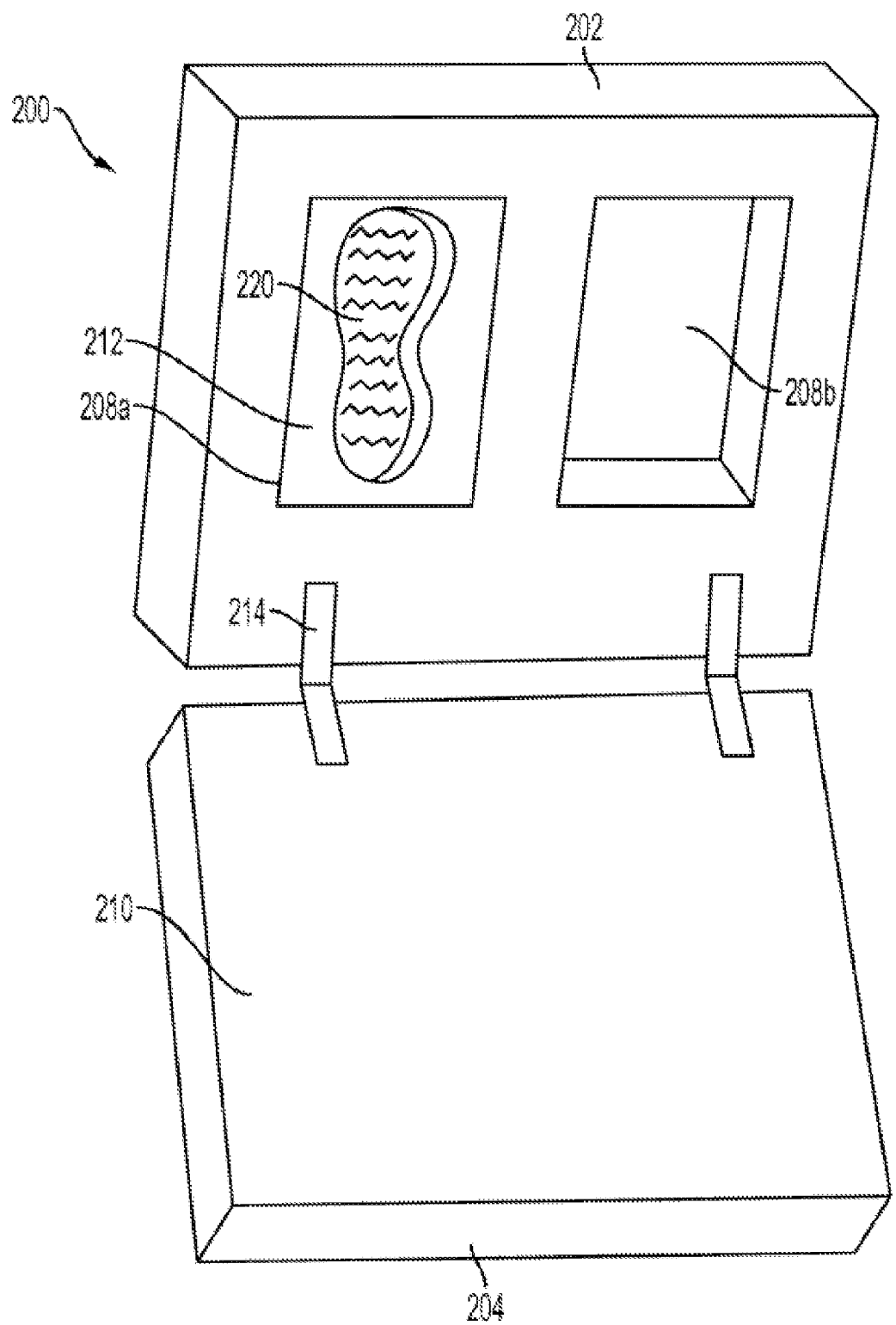
FIG. 2 generally illustrates a perspective view of one example of a two-part mold according to aspects of this invention.

The methods and apparatuses described above have been described in conjunction with production and use of a three part mold 100. The above methods and apparatuses can also be used with a two part mold 200, as shown in FIG. 2. The two part mold 200 includes a top plate 202 having a plurality of apertures 208a, 208b. The apertures 208a, 208b are configured to receive a top mold insert 212. The top mold insert 212 generally includes sidewall portions, front and rear portions, and a bottom portion. The top mold insert 212 forms a cavity 220 in which the molded article is formed and provides a function similar to the top 112 and middle plate mold inserts 150 of the three part mold arrangement 100.

The top plate 202 also includes at least one hinge 214. The at least one hinge 214 is connected to a bottom plate 204 to permit the top 202 and bottom plate 204 to move relative to each other.

The two part mold 100 also includes a bottom plate 204. The bottom plate 204 may be generally rectangular and may include a generally planar surface 210 against which the article being molded is formed. The bottom plate 204 may also include at least one hinge 214 connected to the top plate 202. If desired, the surface 210 of bottom plate 204 may be non-planar, textured, and/or otherwise shaped so as to provide a desired appearance to the corresponding surface of the finally molded article.

Figure 3:
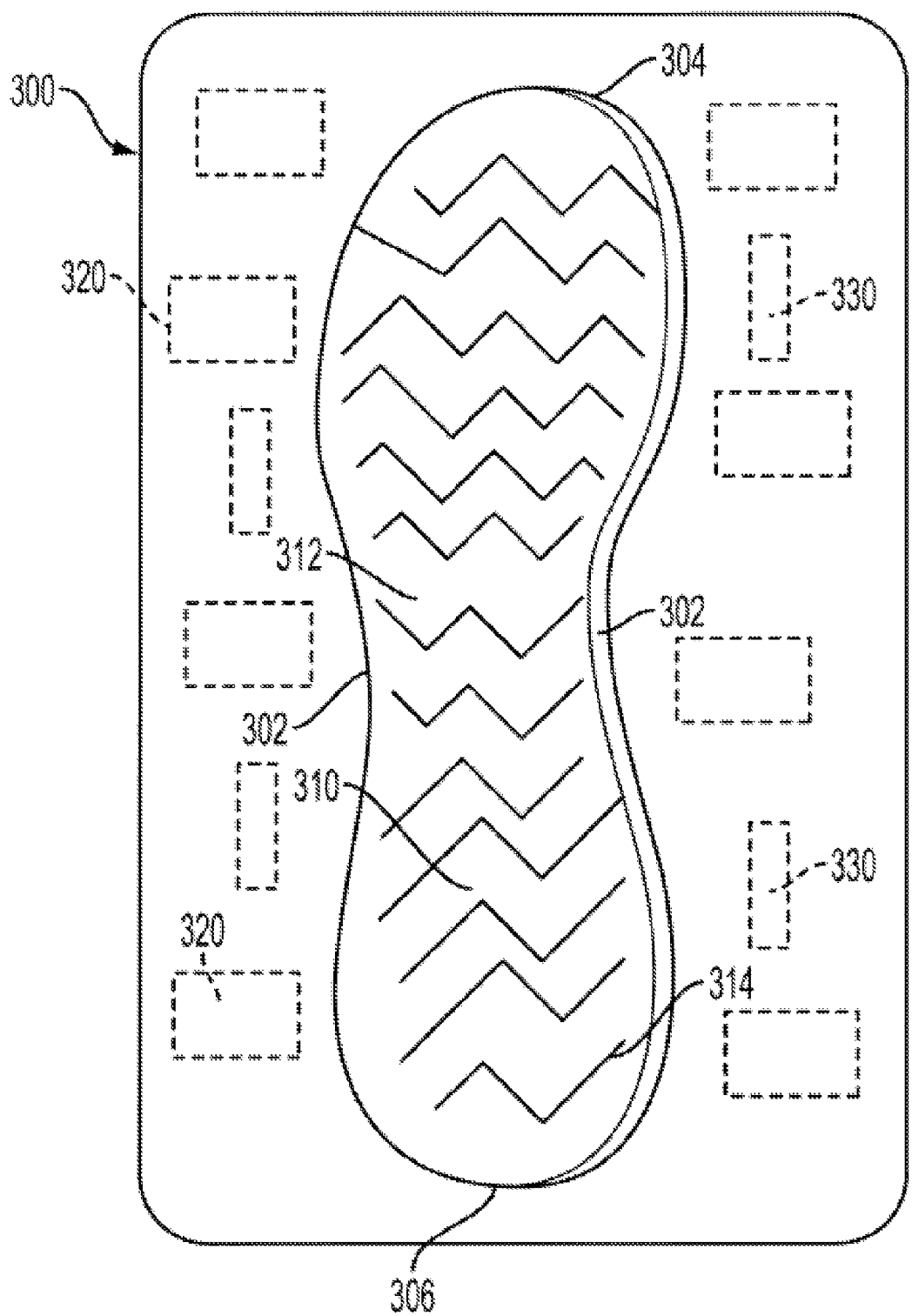
FIG. 3 generally illustrates one example of a mold insert formed according to methods described herein and configured to form an outsole for an article of footwear.
Figure 4:
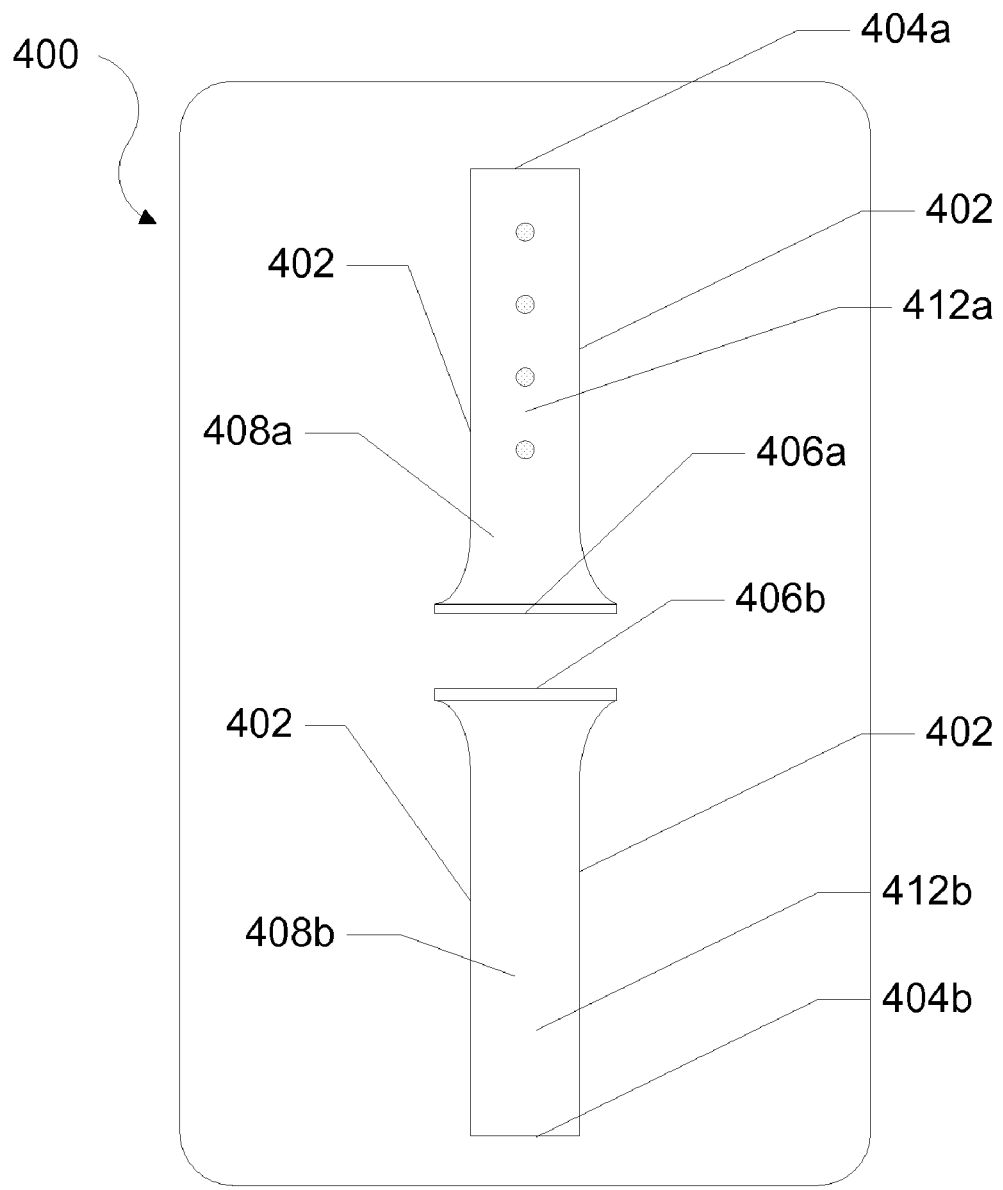
FIG. 4 illustrates another example mold insert formed according to methods described herein and configured to form a watch band.

FIGS. 3 and 4 illustrate example mold inserts 300, 400 that may be used with the two part mold 200 described above. FIG. 3 depicts a simplified mold insert 300 for forming an outsole of an article of footwear. The mold insert 300 includes two sidewall portions 302, a front 304 and rear portion 306, and a bottom portion 310. The mold insert 300 forms a cavity 312 in which the outsole is formed during the molding process. The mold insert 300 also includes a texture 314 that appears on the bottom portion 310 of the mold insert 300. The texture shown is merely one example of a texture that may be included in the mold insert 300.

FIG. 4 illustrates an example mold insert 400 for forming a watch band. The mold insert 400 includes sidewall portions 402 for each side of the watch band, a front portion 404a, 404b for each end of the band and rear portion 406a, 406b for each end of the band. The mold insert 400 further includes a bottom portion 408a, 408b for each major surface of the band that may include details or texture that will be visible on the molded article. The mold insert 400 forms a cavity 412a, 412b for each part of the watch band in which the watch band is formed during the molding process.

FIG. 5 provides a flowchart describing one example method of manufacture of a mold according to aspects described herein. In step 500, a first plate is formed including an aperture for holding a first mold insert. In step 502, a data file such as a CAD file is created wherein a three dimensional model of the first mold insert is created. In step 504, the first mold insert is created using a rapid prototyping technique, such as laser sintering, based on the CAD file created in step 502. In step 506, a second plate is formed. The second plate generally includes one or more apertures into which a second mold insert may be inserted. In step 508, a data file, such as a CAD file, is created wherein a three dimensional model of the second mold insert is created. Step 510 involves creating the second mold insert based on the CAD file created in step 508. The second mold insert is formed using a rapid prototyping technique, such as laser sintering. In step 512, the first and second mold inserts are inserted into their respective plates. In step 514, a third plate is created, which may include a generally planar surface against which the molded article may be formed.

FIG. 6 provides a flowchart describing a method for forming a two part mold according to aspects described herein. In step 600, a first plate is formed including at least one aperture. In step 602, a data file, such as a CAD file, is created wherein virtual design of the mold insert is created. In step 604, at least one mold insert is formed from the CAD file created in step 602. The mold insert may be formed using a rapid prototyping technique, such as laser sintering. In step 606, the mold insert is inserted into the at least one aperture of the first plate. The mold insert may be removably held in the aperture using a fastener, such as bolts, screws, and the like. In step 608, a second plate is formed. The second plate may include a generally planar surface against which the molded article can be formed. In step 610, the second plate is hingedly connected to the top plate forming the mold.

FIG. 7 provides a flowchart describing a method of forming a portion of an article of footwear using one of the mold arrangements described above. For simplicity, the steps of FIG. 7 are shown and described as being used with a two part mold. In step 700, a scan is performed of a user's feet. The scan may be performed using known methods, computer systems, and software. From the scan, a data file, such as a CAD file, is created in step 702, with a virtual design of the desired portion of the article of footwear. The virtual design created is based on the characteristics of the user's feet determined from the scan. In this example, an outsole will be formed. In step 704, a top mold insert is formed from the design in the CAD file. The top mold insert is formed using rapid prototyping techniques, such as laser sintering. As discussed above, the top mold insert may be formed by fusing layers of powder in a layer by layer fashion until the desired mold insert is produced. Once the mold insert is formed, it is inserted into the top plate of the mold in step 706. The mold insert is removably connected to the top plate via fasteners such as screws, bolts, and the like. In step 708, the desired material is inserted into a mold cavity created by the mold insert. For example, the phylon or rubber from which the outsole will be fabricated is inserted into the mold cavity. In step 710, the mold is heated and in step 712 the mold is cooled. Once the mold is cool, the outsole formed is removed from the mold, as in step 714, and is further processed to complete fabrication of the article of footwear.

The mold inserts formed according to aspects described herein may be used in any desired manner with any type of mold apparatus without departing from the invention. Other variations on mold configurations, types of molding processes, fabrication processes, etc., are possible without departing from the invention described herein.

Conclusion

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A method of manufacture of a mold, comprising:
   forming a first plate from a first material, the first plate having a generally planar surface against which an article may be formed;
   forming a mold insert using a rapid prototyping technique, the mold insert being formed of a second material different from the first material;
   forming a second plate having a generally planar portion and at least one aperture formed in the generally planar portion, the aperture configured to receive the mold insert and the generally planar portion of the second plate configured to contact the generally planar surface of the first plate during a molding operation; and
   engaging the first plate with the second plate.

2. The method of claim 1, further including removably connecting the mold insert to the second plate.

3. The method of claim 2, further including connecting the mold insert to the second plate using at least one of screws and bolts.

4. The method of claim 1, wherein the step of forming the mold insert further includes forming the mold insert having a uniform wall thickness.

5. The method of claim 1, wherein the first material is at least one of aluminum and steel.

6. The method of claim 1, wherein the second material is one of nylon, aluminum filled nylon and glass filled nylon.

7. The method of claim 1, wherein the mold insert is formed of a material able to withstand processing at 300-350° F.

8. The method of claim 1, wherein the mold insert is formed of a material able to withstand processing at between 5 and 20 tons.

9. The method of claim 1, wherein the rapid prototyping technique is one of laser sintering, stereolithography, and fused deposition modeling.

10. A method of manufacture of a mold, comprising:
    forming a first plate, including forming a planar region and an aperture configured to receive a first mold insert;
    forming the first mold insert and removably connecting the first mold insert to the first plate, forming the first mold insert including forming a first cavity region in the first mold insert in which at least a portion of a molded article is formed;
    forming a second plate, the second plate being generally planar and providing a surface against which the at least a portion of the molded article is formed;
    forming a third plate, including forming an aperture in the third plate configured for receiving a second mold insert, the third plate being located between the first plate and the second plate; and
    forming the second mold insert and removably connecting the second mold insert to the third plate forming the second mold insert including forming a second cavity region in the second mold insert in which the at least a portion of the molded article is formed; and
    wherein the first and second mold inserts are formed using a rapid prototyping technique.

11. The method of claim 10, wherein the rapid prototyping technique is one of laser sintering, stereolithography and fused deposition modeling.

12. The method of claim 11, wherein forming the first and second mold inserts includes selectively fusing together layers of a powder material.

13. The method of claim 12, wherein the powder material is one of nylon, aluminum filled nylon and glass filled nylon.

14. The method of claim 10, wherein forming the first and second mold inserts includes forming a pattern to be molded onto an exterior surface of the molded article.

15. The method of claim 10, wherein forming the first and second mold inserts includes forming a texture to be molded onto an exterior surface of the molded article.

16. The method of claim 10, wherein forming the first and second mold inserts including forming the mold inserts having a uniform wall thickness.

17. The method of manufacture of a mold of claim 1, wherein forming the mold insert using a rapid prototyping technique includes embedding a heating element in the mold insert.

18. The method of manufacture of a mold of claim 10, wherein forming the first, second and third plates includes hingedly connecting the first, second and third plates.

19. The method of claim 10, wherein the first, second and third plates are arranged substantially parallel to each other and aligned with each other during a molding operation.

* * * * *